(12) United States Patent
Tang et al.

(10) Patent No.: US 12,173,243 B2
(45) Date of Patent: Dec. 24, 2024

(54) METHODS AND COMPOSITIONS FOR PREVENTION OF FOULING IN CAUSTIC TOWERS

(71) Applicant: BL TECHNOLOGIES, INC., Minnetonka, MN (US)

(72) Inventors: Xiaofeng Tang, Shanghai (CN); Guixi Zhang, Shanghai (CN); Mike Hong, Shanghai (CN); Yongtao Shi, Shanghai (CN); Chun Xu, Shanghai (CN); Dengchao Yan, Shanghai (CN)

(73) Assignee: BL TECHNOLOGIES, INC., Minnetonka, MN (US)

( * ) Notice: Subject to any disclaimer, the term of this patent is extended or adjusted under 35 U.S.C. 154(b) by 0 days.

(21) Appl. No.: 17/121,597

(22) Filed: Dec. 14, 2020

(65) Prior Publication Data
US 2021/0095215 A1    Apr. 1, 2021

Related U.S. Application Data

(63) Continuation of application No. 16/084,613, filed as application No. PCT/CN2016/076767 on Mar. 18, 2016, now abandoned.

(30) Foreign Application Priority Data

Mar. 18, 2016    (WO) ............... PCT/CN2016/076767

(51) Int. Cl.
*C10G 75/04*    (2006.01)
*C08F 220/06*    (2006.01)
(Continued)

(52) U.S. Cl.
CPC ............ *C10G 75/04* (2013.01); *C08F 220/06* (2013.01); *C08F 220/585* (2020.02);
(Continued)

(58) Field of Classification Search
CPC .. C10G 19/02; C10G 19/04; C10G 2300/202; C10G 75/04; C08F 220/06;
(Continued)

(56) References Cited

U.S. PATENT DOCUMENTS 3,364,130 A    1/1968 Barnum et al.
3,793,187 A    2/1974 Marx et al.
(Continued)

FOREIGN PATENT DOCUMENTS

CN    1144779 A    3/1997
CN    1521236 A    8/2004
(Continued)

OTHER PUBLICATIONS

Office Action issued in Chinese Application No. 201680085821.7, dated Nov. 10, 2021, with English translation, 13 pages.
(Continued)

*Primary Examiner* — Latosha Hines
(74) *Attorney, Agent, or Firm* — McCarter & English, LLP

(57) ABSTRACT

Methods and compositions for inhibiting carbonyl-based fouling of basic wash systems. The methods comprise contacting the hydrocarbon stream that is or will be subjected to such washing with water soluble or water dispersible copolymers comprising repeat units of 1) ethylenically unsaturated monomers such as acrylic acid with one or more 2) other repeat units such as alkyl acrylates, allyl ethers, ethoxylated allyl repeat units, etc. In other embodiments, a third repeat unit 3) is present and may comprise a hydrophobic moiety such as a styrene repeat unit. The compositions may be terpolymers comprising repeat units 1), 2), and 3).

3 Claims, 1 Drawing Sheet

Filter cake of the treated carbonyl compound fouling

(51) Int. Cl.
| | | |
|---|---|---|
| C08F 220/38 | (2006.01) | |
| C08F 220/58 | (2006.01) | |
| C08F 228/02 | (2006.01) | |
| C09K 15/12 | (2006.01) | |
| C09K 15/28 | (2006.01) | |
| C10G 19/02 | (2006.01) | |
| C10G 19/04 | (2006.01) | |

(52) U.S. Cl.
CPC ............ *C08F 228/02* (2013.01); *C09K 15/12* (2013.01); *C09K 15/28* (2013.01); *C10G 19/02* (2013.01); *C10G 19/04* (2013.01); *C08F 220/382* (2020.02); *C10G 2300/202* (2013.01)

(58) Field of Classification Search
CPC ............ C08F 220/382; C08F 2200/585; C08F 228/02; C09K 15/12; C09K 15/28
See application file for complete search history.

(56) References Cited

U.S. PATENT DOCUMENTS

| | | | |
|---|---|---|---|
| 4,673,489 A | 6/1987 | Roling | |
| 4,869,845 A * | 9/1989 | Chen | C02F 5/10 |
| | | | 210/699 |
| 4,952,301 A | 8/1990 | Awbrey | |
| 5,110,997 A | 5/1992 | Dickakian | |
| 5,160,425 A | 11/1992 | Lewis | |
| 5,194,143 A | 3/1993 | Roling | |
| 5,220,104 A | 6/1993 | McDaniel et al. | |
| 5,264,114 A | 11/1993 | Dunbar | |
| 5,277,823 A | 1/1994 | Hann et al. | |
| 5,413,731 A * | 5/1995 | Adler | C11D 3/3769 |
| | | | 510/230 |
| 5,516,432 A | 5/1996 | King et al. | |
| 5,714,055 A | 2/1998 | Lewis et al. | |
| 5,770,041 A | 6/1998 | Lewis et al. | |
| 5,879,534 A | 3/1999 | Lewis et al. | |
| 5,900,495 A | 5/1999 | Smith | |
| 6,372,121 B1 | 4/2002 | McClain et al. | |
| 6,444,747 B1 * | 9/2002 | Chen | C02F 5/12 |
| | | | 526/287 |
| 6,641,754 B2 | 11/2003 | Buentello et al. | |
| 6,986,839 B2 | 1/2006 | Subramaniyam et al. | |
| 7,094,852 B2 | 8/2006 | Solov et al. | |
| 7,205,447 B2 | 4/2007 | Levin et al. | |
| 7,575,669 B2 | 8/2009 | Subramaniyam | |
| 8,058,497 B2 | 11/2011 | Cao | |
| 8,118,995 B2 | 2/2012 | King et al. | |
| 8,722,954 B2 | 5/2014 | Thoret Bauchet | |
| 2002/0161264 A1 | 10/2002 | Wiese et al. | |
| 2003/0052303 A1 * | 3/2003 | Buentello | C02F 5/10 |
| | | | 252/175 |
| 2008/0245233 A1 | 10/2008 | Gu et al. | |
| 2009/0317621 A1 | 12/2009 | Youngblood et al. | |
| 2010/0059703 A1 * | 3/2010 | Yang | C23F 11/08 |
| | | | 252/76 |
| 2015/0051363 A1 | 2/2015 | Nakano et al. | |

FOREIGN PATENT DOCUMENTS

| | | | | |
|---|---|---|---|---|
| CN | 101379102 A * | 3/2009 | ........ | C08F 216/1458 |
| CN | 102083925 A | 6/2011 | | |
| CN | 102388116 A | 3/2012 | | |
| CN | 103874663 A | 6/2014 | | |
| CN | 104145012 A | 11/2014 | | |
| CN | 102378807 B | 12/2014 | | |
| DE | 19941423 A1 * | 3/2001 | ............. | A61L 15/60 |
| EP | 142929 A2 | 5/1985 | | |
| EP | 264280 A2 | 4/1988 | | |
| EP | 534094 A2 | 3/1993 | | |
| EP | 0877002 A2 | 11/1998 | | |
| EP | 1900788 A1 | 3/2008 | | |
| WO | WO-0234681 A2 * | 5/2002 | ................ | C02F 5/10 |
| WO | 2006124163 A2 | 11/2006 | | |
| WO | WO-2007064629 A1 * | 6/2007 | ............. | C10G 21/12 |
| WO | 2010117509 A1 | 10/2010 | | |
| WO | WO-2018013630 A1 * | 1/2018 | ............... | C09K 5/08 |

OTHER PUBLICATIONS

International Search Report and Written Opinion for International Application No. PCTCN2016/076767, dated Oct. 26, 2016.
Liu,Lixin, et. al. Research on High Temperature Drilling Fluid Thinner St/AMPS/AA. Drilling Fluid & Completion Fluid. Mar. 31, 2012 (Mar. 31, 2012) No. 2 vol. 29 ISSN: 1001-5620 p. 20, "4 Conclusion".
Office Action and Search Report issued in Chinese Patent Application No. 202110971577.7, with English translation, dated Aug. 3, 2022, 21 pages.
Office Action issued in Korean Patent Application No. 10-2018-7030217, with English translation, dated Aug. 17, 2022, 31 pages.
"What is the application of Poly(styrene sulfonic acid)?", Web Article, Chemical Book, dated Aug. 18, 2021, accessed online at URL: https://www.chemicalbook.com/Article/What-is-the-application-of-Poly-styrene-sulfonic-acid.htm#:~:text=Poly(styrene%20sulfonic%20acid%20(PSS,PSS)%20has%20strong%20hydrophilic%20properties).
Notice of Reexamination for Chinese Patent Application No. 201680085821.7 issued Sep. 2, 2024; 17 pp.

* cited by examiner

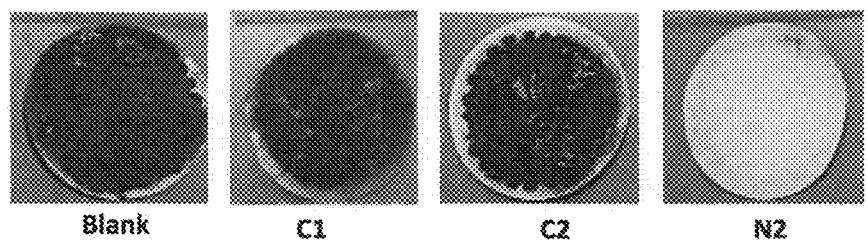
Filter cake of the treated carbonyl compound fouling

METHODS AND COMPOSITIONS FOR PREVENTION OF FOULING IN CAUSTIC TOWERS

CROSS-REFERENCE TO RELATED APPLICATIONS

This application is a continuation of U.S. application Ser. No. 16/084,613, filed Sep. 13, 2018, which claims priority to International Appl. Serial No. PCT/CN2016/076767, filed Mar. 18, 2016, the entireties of which are incorporated herein by reference.

FIELD OF INVENTION

The invention relates to methods and compositions for inhibiting the formation of fouling deposits in basic wash systems of the type adapted to scrub impurities, such as those that may be formed via aldol condensation reactions, from liquid or gas phase hydrocarbonaceous streams.

BACKGROUND OF THE INVENTION

Olefinic compounds such as ethylene, propylene, butylene, and amylene can be formed from methanol to olefin (MTO) or various pyrolytic cracking processes. In these processes, a variety of carbonyl compounds such as aldehydes and ketones are often formed. Typically, the carbonyl compounds are found in the gas stream in about 1 to 200 parts per million (ppm) by weight relative to the hydrocarbon stream with concentrations of more than 1,000 ppm sometimes encountered due to the particular feedstock and reactor operation parameter employed for the reactions.

The hydrocarbon product stream formed via cracking or MTO processes is cooled and sometimes compressed. The product gas stream may be passed through a basic wash system (pH>7) to remove acidic components such as hydrogen sulfide and carbon dioxide. In many cases, the carbonyl compounds present, such as the aldehydes, will undergo polymerization to form condensation polymers known as aldol polymers or red oil. These aldol polymers or red oil possess low solubility in the alkaline wash and the hydrocarbon media and can deposit on wash tower tray conduits and other internal surfaces of the process equipment leading to fouling and eventual plugging. These deposits can restrict flow through the equipment and can cause undesirable pressure drops, resulting in decreased process throughput, increased operating costs, and unit shut down for periodic cleaning.

The basic wash systems in which treatment is required to inhibit such polymer-based fouling include amine acid gas scrubber, such as MEA, DEA, isopropyl amine, butyl amine, etc., and caustic wash systems.

Generally, the basic washing entails contacting the gaseous olefins with an aqueous basic solution in a wash tower to remove hydrogen sulfide, carbon dioxide, and other oxygenated compounds therefrom. The basic washing is particularly appropriate for the basic washing process which follows the pyrolytic cracking of such hydrocarbons as ethane, propane, butane, naphtha, and mixtures thereof to produce the corresponding gaseous ethylene, propylene, butadiene, and the like, or follows the MTO production process containing the carbonyl and other contaminants.

SUMMARY OF THE INVENTION

In one embodiment of the invention, methods are provided for inhibiting the formation of fouling materials comprising contacting a hydrocarbon media containing aldehyde compounds with an antifoulant. The hydrocarbon media is treated in a basic wash system. The antifoulant may comprise a polymer having repeat units characterized by the formula

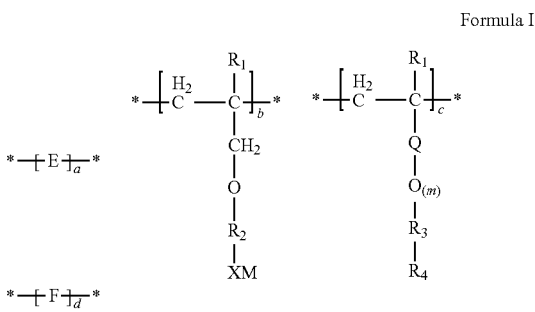

Formula I wherein a must be present, b or c or b+c is present and d may or may not be present; E is a repeat unit remaining after polymerization of an ethylenically unsaturated compound and can be, for example, (meth) acrylic acid or (meth) acrylamide; each $R_1$ is independently chosen from H or lower ($C_1$-$C_4$) alkyl; $R_2$ is a hydroxy substituted alkyl or alkylene moiety having from about 1-6 carbon atoms, X is an anionic radical selected from the group consisting of $SO_3$, $OSO_3$, $PO_3$ $OPO_3$ or COO; M is one or more hydrogens or any water soluble cationic moiety that counterbalances the valence of the anionic radical X and can be Ca, Na, K, $NH_4$, etc.; F is an ethylenically unsaturated hydrophobic moiety such as styrene and its derivatives, acrylonitrile, olefin with ($C_1$-$C_{18}$) alkyl group, alkyl (meth) acrylate; Q in repeat unit c is chosen from $C_1$-$C_3$ alkylene or carbonyl, m is 0 or 1, $R_3$ is $-(CH_2-CH-O-)_n$ or $-(CH_2-CHCH_3-O-)_n$ wherein n is from 1 to about 100 or $R_3$ is $CH_2$—CHOH or $CH_2$—CH—(OH)—$CH_2$; $R_4$ is H, OH, $SO_3M$, $OSO_3M$, $PO_3M$, $OPO_3M$, or $CO_2M$; with the proviso that when d is present it is present in an amount of 0.01-0.8 moles based on 1 mole of a; either b or c, or both b+c (when both are present) are present in a molar ratio of a:b or a:c or a:(b+c) of 0.1-100, or in some exemplary embodiments 1-10.

In certain embodiments, the polymeric antifoulant may comprise a copolymer of acrylic acid (AA) and allyl ether. In other embodiments of the invention, the polymeric foulant may be an acrylic acid (AA) allylhydroxylated alkyl ether, also referred to as 1-propane sulfonic acid, 2-hydroxy-3 (2-propenyl oxy) mono sodium salt (AHPSE).

The polymeric antifoulant may also be a terpolymer of AA/AHPSE/styrene or it may be, in certain embodiments, a copolymer of acrylic acid and an allyl polyethylene glycol ether. In some cases, the polymer may comprise a copolymer of acrylic acid with an ethoxylated allyl ether. In other embodiments, the copolymer may comprise acrylic acid and lower alkyl acrylates such as hydroxy substituted alkyl acrylates.

In another aspect of the invention, novel water soluble or water dispersible polymer compositions are provided having the structure

Formula VI wherein a, z, and d are all present; $-\!\!+\!\!E\!\!+\!\!-$ is a repeat unit remaining after polymerization of an ethylenically unsaturated compound, $-\!\!+\!\!F\!\!+\!\!-$ is a repeat unit remaining after polymerization of an ethylenically unsaturated hydrophobic moiety; wherein the molar ratio of d:a is about 0.1-0.8 moles of d:1 mole a; z is present in an amount of a:z of 0.1-100, 1-10 moles a per 1 mole z and in some embodiments is present in an amount of 1-10 moles of a per mole z; —(-G-)— is a repeat unit chosen from VIa, VIb, VIc, or VId or mixtures thereof, wherein VIa is

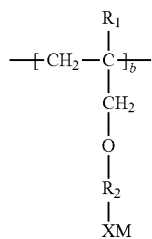

VIb is

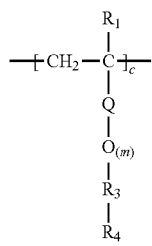

wherein $R_1$ is H or lower ($C_1$-$C_4$) alkyl, $R_2$ is a hydroxy substituted alkyl or alkylene moiety having from about 1-6 carbon atoms, X is an anionic radical selected from the group consisting of $SO_3$, $OSO_3$, $PO_3$, $OPO_3$, or COO; M is H or hydrogens or any water soluble cationic moiety that counterbalances the valence of the anionic radical X; Q is chosen from $C_1$-$C_3$ alkylene or carbonyl, m is 0 or 1; $R_3$ is —(-$CH_2$—$CH_2$—O-)$_n$—$CH_2CHCH_3O$-)$_r$, wherein n=1 to 100; or $R_3$ is hydroxylated lower ($C_1$-$C_4$) alkylene; and $R_{4i}$, is H, OH, $SO_3M$, $OSO_3M$, $PO_3M$, $OPO_3M$, or $CO_2M$;

VIc is

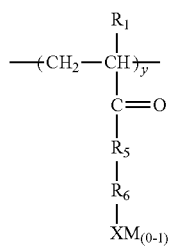

wherein $R_1$ is as defined above, $R_5$ is NH or O; $R_6$ is lower ($C_1$-$C_4$) alkyl or alkylene or lower ($C_1$-$C_4$) hydroxy substituted alkyl or alkylene; X and M are as defined above; and VId is

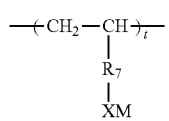

wherein $R_7$ is $CH_2$ or benzyl, and X and M are defined above.

In some embodiments, the hydrocarbon stream is a methanol to olefin (MTO) process stream or a cracked hydrocarbon stream from the pyrolysis of hydrocarbons. In some embodiments, the cracked hydrocarbon stream is from the pyrolysis of ethane, propane, butane, naphtha, or mixtures thereof. In some embodiments, treating said hydrocarbon stream with a basic wash is prior to the production of gaseous ethylene, propylene, and/or butadiene.

In further aspects of the invention, novel water soluble terpolymer compositions are provided that comprise acrylic acid or acrylic acid salt repeat units, a hydrophobic repeat unit such as styrene and its derivatives, acrylonitrile, olefin with ($C_1$-$C_{18}$) alkyl group, alkyl (meth) acrylate, and a third repeat unit selected from the group consisting acrylamide repeat units, allyl ether repeat units, lower alkyl ($C_1$-$C_4$) acrylate repeat units, ethoxylated or propoxylated allyl repeat units, allyl polyethylene glycol ether repeat units, sulfonated styrene repeat units, and allyl sulfonic acid repeat units. Terpolymers wherein the hydrophobic monomeric repeat unit comprises styrene may be mentioned as exemplary.

BRIEF DESCRIPTION OF THE DRAWING

The invention is further described in connection with the drawings wherein:

FIG. 1 is a microphotograph of filter cakes resulting from candidate antifoulant treatments as referred to in Example 3.

DETAILED DESCRIPTION

In one aspect of the invention, methods and compositions are provided to inhibit the formation of polymeric based fouling deposits during the basic washing of hydrocarbons contaminated with carbonyl compounds which lead to the formation of undesirable insoluble polymer contaminants. In one embodiment, the antifoulant compound is a polymer having the Formula I

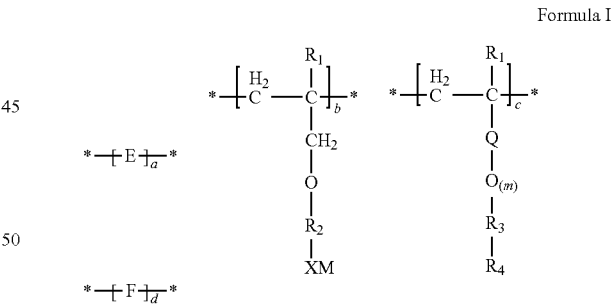

wherein a must be present and either b or c or both b and c are present; d may or may not be present. In one embodiment, d is present. E is a repeat unit remaining after polymerization of an ethylenically unsaturated compound including carboxylic acids such as acrylic acid, sulfonic acid, phosphonic acid, or amide of such acid or mixtures thereof; E can be for example (meth) acrylic acid or (meth) acrylamide; each $R_1$ is independently chosen from H or lower ($C_1$-$C_4$) alkyl. $R_2$ is a hydroxy substituted alkyl or alkylene moiety having from about 1-6 carbon atoms, X is an anionic radical selected from the group consisting of $SO_3$, $OSO_3$, $PO_3$, $OPO_3$, or COO; M is one or more hydrogens or any water soluble cationic moiety that counterbalances the valence of the anionic radical X including but not limited to Na, K, Ca, or $NH_4$; F is an ethylenically unsaturated hydrophobic moiety such as styrene, and its derivatives, acrylonitrile, olefin with ($C_1$-$C_{18}$) alkyl group, alkyl (meth) acrylate.

Q in repeat unit c is chosen from $C_1$-$C_3$ alkylene or carbonyl; m is O or meaning that O may or may not be present, $R_3$ is $-(CH_2-CH_2-O)_n$ $-(CH_2-CHCH_3-O)_n$ wherein n ranges from about 1 to 100, including 1 to 20, or $R_3$ is hydroxylated lower ($C_1$-$C_4$) alkylene such as $CH_2-CH(OH)$ or $CH_2-CH(OH)-CH_2$; $R_4$ is H, OH, $SO_3M$, $OSO_3M$, $PO_3M$, $OPO_3M$, $CO_2M$ or mixtures thereof with M being previously defined.

In Formula I above, when d is present, it is present in an amount of about 0.01-0.8 moles based on 1 mole of a. Either b or c, or both b or c if both are present, are present in a monomer ratio of a:b or a:c or a:(b+c) of 0.1-100, including 1-10. The molecular weight of polymers as set forth in Formula I is not critical as long as the polymer is water soluble or water dispersible. In some embodiments, the molecular weight can range from about 500-50,000 ($\overline{Mn}$).

Exemplary polymers that may be used to inhibit fouling in hydrocarbonaceous media containing carbonyl compounds such as aldehydes, include acrylic acid/allyl ether copolymers such as acrylic acid/allyl hydroxylated alkyl copolymers and water soluble salt forms thereof such as acrylic acid/l-propane sulfonic acid, 2 hydroxy-3(2-propenyl oxy) mono sodium salt also referred sometimes to as acrylic acid/allyl hydroxypropyl sulfonate ether (AHPSE). Additionally, terpolymers comprising acrylic acid/AHPSE/ and styrene repeat units can also be mentioned. For example, such hydrocarbonaceous media or hydrocarbonaceaous streams containing carbonyl compounds may include hydrocarbonaceous materials obtained from plastics/polymers or bio-materials processing/conversion, and/or the like.

Acrylic acid/ethoxylated allyl ethers such as those enumerated in U.S. Pat. No. 7,094,852 can also be mentioned as exemplary. These include acrylic acid/allylpolyethoxylated copolymers such as acrylic acid/allylpolyethoxy (10) sulfate (APES) and others. Also, acrylic acid/allyl polyethylene glycol ethers such as those set forth in U.S. Pat. No. 6,641,754 are noteworthy. One particular terpolymer of interest is a terpolymer of acrylic acid/AHPSE/and ammonium allyl polyethoxy (10) sulfate.

Other exemplary polymers can include water soluble or water dispersible acrylic acid/hydroxylated alkyl acrylates such as acrylic acid/2 hydroxypropylacrylate copolymers. Certain of the exemplary polymers are shown in Formula II-V following:

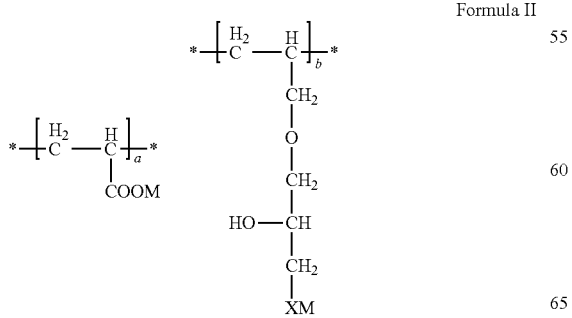

Formula II

The copolymer shown in Formula II may be referred to as AA/AHPSE (as herein used AA denotes acrylic acid and/or its various water soluble salt forms), and AHPSE has been previously referred to.

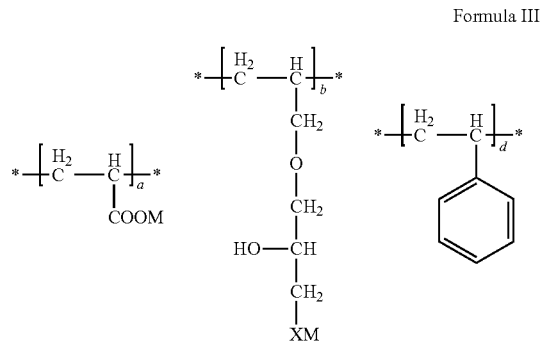

Formula III

The terpolymer shown in Formula III may be referred to as AA/AHPSE/styrene.

Formula IV

AA/AHPSE/APES/Styrene

Formula V

This may be referred to as AA/AHPSE/allylpolyethoxy (10) sulfate (APES).

The antifoulant polymers may be fed to the basic (pH>7) wash tower itself or to input or recycle lines in communication with the wash tower. In some cases, the antifoulant is dosed into the caustic solution feed or recycle lines that are in fluid communication with the wash tower. Typically, the antifoulant polymers are fed to the hydrocarbon stream (charge gas) in an amount of 1-2,000 ppm by weight relative to the hydrocarbon stream. In other embodiments, the antifoulants are fed in an amount of about 1-1,000 ppm. In one embodiment, the feed rate may be from about (0.01-100)X of the antifoulant wherein X is the molar concentration of aldehyde or ketone in the charge gas.

In Formulae III and IV, a, b, and c are, independently, zero or a positive integer such that the molecular weight of the molecule is less than about 500,000 Daltons, such as from 500-500,000 Daltons. In Formula V, a, b, c, and d, are independently zero or positive integers such that the molecular weight of the molecule is less than about 500,000 Daltons.

In some aspects of the invention, the antifoulant is conjointly used with other carbonyl scavengers which can include alcohol amines such as triisopropanolamine, diglycolamine, aminomethylpropanol, N,N-diethylethanolamine, monoisopropanolamine, monoethanolamine, diethanolamine, triethanolamine, dimethylaminoethanol, and etc.; alkyl amines, such as phenothiazine, diazacyclohexane, N—N-dimethyldodecylamine, N,N'-bis(1-methylpropyl)-1,4-phenylenediamine, aminoethylpiperazine, 1,2-dianilinoethane, diethylenetriamine and etc.; keto-amines, such as triacetonamine; amino acids, such as 6 amino caproic acid; hydrazide compounds, such as 1,2-diformylhydrazine, carbohydrazide, N-methyl-hydrazide, oxalyldihydrazide, chlorobenzhydrazide, aminobenzhydrazide, benzoic hydrazide, and etc.; hydroxylamine compounds, such as N,N-diethylhydroxylamine, isopropyl hydroxylamine, hydroxylamine sulfate, N,N-dialkylhydroxylamine, and etc.; reducing sugars, hydroxybenzenes, acetoacetate ester compounds, lactams, oxidizers, such as hydroperoxide, peroxyester, percarbonate compounds and etc.; and reducer, such as sodium borohydride, sodium (bi)sulfite and etc. These additional compounds may be present in an amount of about 1 to about 2,000 ppm by weight relative to the hydrocarbon stream.

In another aspect of the invention, novel water soluble or water dispersible polymers are provided that are useful as deposit control, scale inhibition and anti-foulant treatments in hydrocarbon media. As an example, these polymers may be used to inhibit carbonyl-based polymer deposits that may otherwise form in basic washing systems employed in MTO and olefin cracking processes. The antifoulant polymers generally have the Formula VI

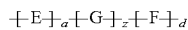  Formula VI wherein a, z, and d are all present. $-\!\!\!-\!\!\text{E}\!\!-\!\!\!-$ and $-\!\!\!-\!\!\text{F}\!\!-\!\!\!-$ are as previously defined in conjunction with Formula I. G is VIa, VIb, VIc, or VId or mixtures thereof, or $-\!\!\!-\!\!\text{G}\!\!-\!\!\!-$ is either or both of the repeat unit moieties of b and c as set forth in Formula I, wherein VIa is

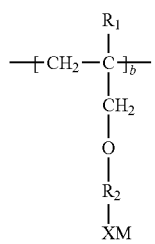

VIb is

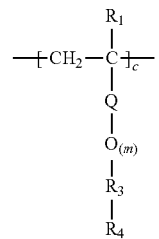

wherein $R_1$ is H or lower ($C_1$-$C_4$) alkyl, $R_2$ is a hydroxy substituted alkyl or alkylene moiety having from about 1-6 carbon atoms, X is an anionic radical selected from the group consisting of $SO_3$, $OSO_3$, $PO_3$, $OPO_3$, or $COO$; M is H or hydrogens or any water soluble cationic moiety that counterbalances the valence of the anionic radical X; Q is chosen from $C_1$-$C_3$ alkylene or carbonyl, m is 0 or 1; $R_3$ is $-\!(CH_2-CH_2-O-)_n$; $-CH_2CHCH_3O-)_n$ wherein n=1 to 100; or $R_3$ is hydroxylated lower ($C_1$-$C_4$) alkylene; and $R_4$ is H, OH, $SO_3M$, $OSO_3M$, $PO_3M$, $OPO_3M$, or $CO_2M$ or mixtures thereof with M being as previously defined;

VIc is

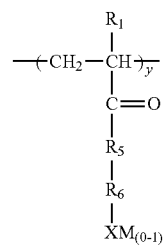

wherein $R_1$ is as defined above, $R_5$ is NH or O; $R_6$ is lower ($C_1$-$C_4$) alkyl or alkylene or lower ($C_1$-$C_4$) hydroxy substituted alkyl or alkylene; X and M are as defined above; and VId is

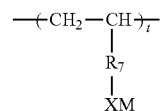

wherein $R_7$ is $CH_2$ or benzyl, and X and M are defined above.

In Formula VI, the molar ratio of d:a is about 0.1-0.8 moles of d per 1 mole a; z is present in an amount of a:z of 0.1-100 moles a per 1 mole z with certain embodiments having 1-10 moles a per 1 mole z.

Exemplary polymers in accordance with Formula VI include acrylic acid(AA)/2-acryloylamino-2-methyl-1-propanesulfonic acid (AMPS)/styrene terpolymers (i.e., Formulae VI and VIc) wherein E is AA, $R_5$ is NH, $R_6$=2-methylpropane, and X is $SO_3^-$; F is styrene. Additionally, Formula VI terpolymers of AA/allysulfonic acid/styrene can be noted wherein $R_7$ in Formula VId is $CH_2$ with X being $SO_3^-$. Also, in some embodiments, $R_7$ can comprise a benzyl moiety with X being $SO_3^-$, namely AA/sulfonated styrene/styrene terpolymers.

Further, other terpolymeric combinations within the ambit of Figure VI include AA/AHPSE/styrene terpolymers, AA/lower alkyl ($C_1$-$C_4$) acrylate/styrene terpolymers, AA/hydroxylated alkyl ($C_1$-$C_4$) acrylate/styrene terpolymers, AA/allyl polyethylene glycol (PEG) ether/styrene terpolymers; AA/allyl polyethyoxy sulfate(APES)/styrene terpolymers and AA/PEG allyl ether/APES/styrene polymers.

The polymers of the invention can be prepared via radical chain addition polymerization of the requisite monomers. The reaction may proceed, for example, under conventional solution polymerization techniques. The requisite monomers may be mixed with water and alcohol. Polymerization initiators such as the persulfate initiators, peroxide initiators, etc., may be employed. The resulting copolymers, terpolymers, quad polymers, etc. (at least four monomeric repeat units) may be isolated by well known techniques such as distillation, etc., or the polymer may simply be used in aqueous solution.

For example, a terpolymer in accordance with Formula III can be prepared as follows:
1. Charge initial 97.7 g (sodium 1-allyloxy 2-hydroxy propyl sulfonate) and 50 g DI water into the reactor and set up the reactor
2. Record reactor weight
3. Sparge with $N_2$ for 10 minutes
4. Switch to a nitrogen blanket and heat to 90° C.
5. Start a simultaneous co-feed of the following reagents
    39 g Acrylic Acid over 150 minutes
    5 g Styrene over 60 minutes 25 g Sodium persulfate (5%) over 150 minutes
6. After feed, hold at 90° C. for 90 minutes
7. Cool to room temperature and add caustic solution (50% NaOH solution) and dilution water
8. Measure reactor weight and solid content.

In some aspects of the invention, a water soluble terpolymer composition is provided that comprises: i) acrylic acid or acrylic acid salt repeat units, ii) a hydrophobic repeat unit such as styrene repeat units, and a third repeat unit iii). The third repeat unit may be selected from the group consisting of acrylamide repeat units, allyl ether repeat units, lower alkyl ($C_1$-$C_4$) acrylate repeat units, ethoxylated or protoxylated allyl repeat units, allyl polyethylene glycol ether repeat units, sulfonated styrene repeat units, and allyl sulfonic acid repeat units.

In some cases, the third repeat unit may be 2-acrylamido-2-methyl-1 propane sulfonic acid (AMPS). In other cases, the third repeat unit may be allyl hydroxypropyl sulfonate ether (AHPSE). Still, in other aspects, the third repeat unit may comprise allylpolyethoxy sulfonate (APES). Additionally, the third repeat unit may, in some aspects of the invention, comprise hydroxypropyl acrylate (HPA). In other embodiments, this third repeat unit may comprise AHPSE, and a fourth repeat unit may be present. This fourth repeat unit may comprise APES.

These terpolymer comprising repeat units i), ii), and iii) may comprise monomeric repeat units of about 0.01-0.8 moles ii) per mole of i). The repeat unit iii) may be present in an amount of about 0.1-100, including 1-10 moles i) per mole of iii). Molecular weight of these polymers may range from about 500-500,000 (ME).

The invention will be described in conjunction with the following specific examples which are to be regarded as illustrative and not as restricting the scope of the invention.

EXAMPLES

Example 1

In order to simulate carbonyl compound fouling in caustic towers and to evaluate the dispersion capability and fouling inhibition of candidate compounds, the following procedure was employed.

TABLE 1

Components of simulated carbonyl compound fouling and treatment

| Components | Concentration |
| --- | --- |
| NaOH | 10% (w/w) |
| Dispersant/inhibitor | 0-1000 ppm |
| Acetaldehyde | 2000 ppm |

25 ml 10% NaOH and no dispersant (blank)/1000 ppm dispersant were charged into a 30 ml glass bottle. The bottle was capped and the solution was mixed. Then 2000 ppm aldehyde was dosed into the bottles and mixed after the bottle had been capped tightly. After that, the mixture was incubated in a water bath at 50° C. for 24 hours. Finally, the mixture appearance of the bottle was recorded immediately when being taken out of the water bath without shaking. Thus, the sample untreated and samples tested with the candidates listed in Table 2 were tested. Results are shown in Table 3.

Dispersant/inhibitor candidates were selected. Some of these included known dispersant/inhibitors that are commonly used to control carbonyl-based fouling. These are designated in Table 2 with the prefix "C" (comparative). Dispersant inhibitor compounds in accordance with the invention are denoted by the prefix "N".

TABLE 2

Candidates of inhibitor and dispersant

| Candidate | Chemical |
| --- | --- |
| C1 | 30% Hydroxylamine sulfate |
| C2 | 45% Naphthalene sulfonate formaldehyde condensate |
| C3 | Poly(AA/AMPS) (43% solid) |
| C4 | PAA (50% solid) |
| C5 | PMA (50% solid) |
| C6 | Sodium Ligninsulfonate (45% solid) |
| N1 | Chemical with Formula II (37% solid) |
| N2 | Chemical with Formula III (37% solid) |
| N3 | Chemical with Formula IV (50% solid) |
| N4 | Chemical with Formula V (51% solid) |

AA = acrylic acid or salt thereof; poly (AA/AMPS) = poly (acrylic acid/2-acrylamido-2-methylpropane sulfonic acid); PAA = polyacrylic acid, PMA = poly maleic acid; $N_1$ = poly (acrylic acid/ allyl 2-hydroxypropyl sulfonate ether (AA/AHPSE)); $N_2$ = poly (acrylic acid/AHPSE/styrene) terpolymer; N3 = poly (AA/AHPSE/allylpolyethoxy (10) sulfate (APES)); N4 = poly (AA/AHPSE/APES/styrene).

Carbonyl compound fouling dispersion capability of the common dispersants in water system was studied. The carbonyl compound fouling was simulated and treated as Example 1. The dispersion performance of the candidates in Table 2 was studied under 1000 ppm product dosage by weight relative to the total solution. Table 3 shows the test results. From the appearance, we can conclude that the C1, C3, C4 and C5 did not show any dispersion capability to the carbonyl compound fouling at 1000 ppm dosage. C2 and C6 possessed some dispersion capability to the formed fouling. The sample treated with N1 resulted in a homogeneous suspension with a little precipitation, no flocs observed. This indicates that N1 possesses good dispersion capability to the polymeric fouling caused by carbonyl compound, such as aldehyde in caustic tower. N2 showed the best dispersion performance without any flocs or precipitation. The hydrophobic monomer in N2 enhances its dispersion capability.

TABLE 3

Carbonyl compound fouling dispersion test result

| Candidate | Result |
|---|---|
| Blank | Severe flocs |
| C1 | Severe flocs |
| C2 | Flocs |
| C3 | Severe flocs |
| C4 | Severe flocs |
| C5 | Severe flocs |
| C6 | Moderate Flocs |
| N1 | Homogeneous suspension with a little precipation |
| N2 | Homogeneous suspension |
| N3 | Homogenous suspension with a little precipitation |
| N4 | Homogenous suspension |

Example 2

The carbonyl compound fouling dispersion performance of C2, N1 and N2 was studied under dosage from 500 to 1000 ppm. The carbonyl compound fouling was simulated and treated as Example 1. Table 4 lists the test result. From the table, it can be observed that N2 showed the best dispersion capability, 800 ppm dosage was enough to keep the fouling suspension stable under lab static test condition.

TABLE 4

Carbonyl compound fouling dispersion V.S. dosage

| Treatment reagent | 500 ppm | 800 ppm | 1000 ppm |
|---|---|---|---|
| C2 | Severe flocs | Flocs | Flocs |
| N1 | Severe flocs | Flocs | Homogeneous suspension with a little precipation |
| N2 | Floc | Homogeneous suspension | Homogeneous suspension |

Example 3

The dispersion capability was evaluated with a filtration method. The carbonyl compound fouling was simulated and treated by the procedures similar with Example 1. 200 ml 10% NaOH was charged into 500 ml glass bottle and no treatment (blank) and 1000 ppm treatment reagents, including C1, C2 and N2 were dosed into the bottles. The bottles were capped and shaken. Then, 2000 ppm aldehyde was dosed into the above solution and mixed. After that, the mixture was incubated in water bath at 50° C. for 24 hours immediately. Finally, the bottle was taken out, mixed and then the suspension was filtrated with 0.8 μm fiberglass filter. FIG. 1 shows the filter cakes of the fouling treated with corresponding chemicals. It can be observed that there was no fouling substance kept on the surface of the filter after being treated with N2. It shows that the fouling particle size after being treated with N2 is smaller than 0.8 μm. This indicates N2 possesses excellent capability to disperse carbonyl compound fouling into small particles. This kind of capability can prevent the fouling to flocculate or precipitate, so to eliminate the jamming or blockage in the caustic tower tray or pipelines during MTO, ethylene or propylene production process.

While this invention has been described with respect to particular embodiments thereof, it is apparent that numerous other forms and modifications of this invention will be obvious to those skilled in the art. The appended claims in this invention generally should be construed to cover all such obvious forms and modifications which are within the true spirit and scope of the present invention.

The invention claimed is:

1. A water soluble terpolymer selected from the group consisting of acrylic acid/allyl hydroxylated alkyl ether/styrene, acrylic acid/allyl hydroxypropyl sulfonate ether/styrene and acrylic acid/allyl polyethylene glycol ether/styrene.

2. A water soluble polymer comprising four repeat units, said polymer selected from the group consisting of acrylic acid/polyethylene glycol allyl ether/allylpolyethoxy (10) sulfate/styrene and acrylic acid/allyl hydroxypropyl sulfonate ether/allyl polyethyoxy (10) sulfate/styrene.

3. The water soluble terpolymer composition as recited in claim 1, wherein the molecular weight of these polymers may range from about 500-500,000 ($\overline{Mn}$).

* * * * *